(12) United States Patent
Tai et al.

(10) Patent No.: US 7,499,990 B1
(45) Date of Patent: Mar. 3, 2009

(54) APPARATUS AND METHOD FOR MANAGING MOBILE AGENTS

(75) Inventors: Hideki Tai, Yamato (JP); Gaku Yamamoto, Tokyo-to (JP); Yuhichi Nakamura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1832 days.

(21) Appl. No.: 09/713,929

(22) Filed: Nov. 16, 2000

(30) Foreign Application Priority Data

Nov. 17, 1999 (JP) ................................. 11-327276

(51) Int. Cl.
*G06F 15/173* (2006.01)
*H04Q 7/20* (2006.01)

(52) U.S. Cl. .................................. 709/223; 455/456.5
(58) Field of Classification Search .................. 706/45; 709/223; 710/19; 455/456.5
See application file for complete search history.

(56) References Cited

U.S. PATENT DOCUMENTS

| | | | |
|---|---|---|---|
| 5,943,621 A * | 8/1999 | Ho et al. .................. | 455/456.3 |
| 6,240,080 B1 * | 5/2001 | Okanoue et al. ............ | 370/338 |
| 6,282,582 B1 * | 8/2001 | Oshima et al. .............. | 719/317 |
| 6,356,905 B1 * | 3/2002 | Gershman et al. ............. | 707/10 |
| 6,668,249 B1 * | 12/2003 | Kase et al. ..................... | 706/45 |
| 2001/0022558 A1 * | 9/2001 | Karr et al. ................... | 342/450 |
| 2002/0159479 A1 * | 10/2002 | Watanuki et al. ............ | 370/466 |
| 2002/0178026 A1 * | 11/2002 | Robertson et al. .............. | 705/1 |

* cited by examiner

*Primary Examiner*—Jason D Cardone
*Assistant Examiner*—Tanim Hossain
(74) *Attorney, Agent, or Firm*—Lisa M. Yamonaco; Anne Vachon Dougherty

(57) ABSTRACT

A system and method thereby each of a plurality of agent servers keeps and manages history of movement. Each of the agent servers temporarily stores requests for updates of location information of a mobile agent associated to accumulated number of movement of the mobile agent and periodically sends it to a registration server so that no congestion will occur in accessing the registration server. The registration server renews location information of a mobile server only with the request for update of a higher accumulated number of movements so as not to overwrite newer information with older information.

2 Claims, 26 Drawing Sheets

Requests to be stored in a request buffer

```
[AgentID, (Kind, HopCount)]

Agent
    An ID of a subject mobile agent
Kind
    A kind of a request
        REGIST : Generation, on arrival (requests update of a management table of an arrival server)
        UNREGIST : On disposal (requests deletion of an entry from a management table of a registration server)
HopCount
    A request generation
        When a request is generated, total accumulated number of movement of a mobile agent
```

Fig. 16

Entries of a management table of a registration server

```
[AgentID, (Address, HopCount,InUse)]

AgentID
    An ID of a subject mobile agent
Address
    An address of an agent server, which is a starting point of tracing a mobile agent
HopCount
    A request generation
        When a request is generated, total accumulated number of movement of a mobile agent
InUse
    Entry use count
        If 1 or more, it is in use
        Used in order to prevent deletion of an entry or history of movement while tracing
```

Fig. 17

History of movement

```
[AgentID, Destination]

AgentID
    An ID of a subject mobile agent
Address
    An address of an agent server of a movement destination of a mobile agent
```

Fig. 18

Case 1:
N = 9 (Total number of agents : 90)

| Conventional method (Registry) | This method | No tracing facility |
|---|---|---|
| 79,483 | 63,599 | 61,084 |
| 80,008 | 66,079 | 65,241 |
| 90,480 | 66,079 | 66,504 |

Fig. 29

Case 2:
N = 15 (Total number of agents : 150)

| Conventional method (Registry) | This method | No tracing facility |
|---|---|---|
| 145,356 | 100,240 | 97,002 |
| 153,234 | 107,596 | 108,289 |
| 179,300 | 109,654 | 112,066 |

Fig. 30

APPARATUS AND METHOD FOR MANAGING MOBILE AGENTS

FIELD OF THE INVENTION

The present invention relates to an apparatus and a method for managing locations of mobile agents.

BACKGROUND OF THE INVENTION

In the event of managing mobile agents or in the event that a user sends or restores a message for his or her own agent issued in the past, it is necessary to manage information of where the mobile agents are located now.

For instance, a method for tracing locations of mobile agents by logging is disclosed in "GMD FOKUS and IBM Corp., Mobile Agent System Interoperability Facilities Specification, OMG TC Document (orbos/97-10-05), November 1997 ([MASIF]; Document 1).

Also, a method for tracing locations of mobile agents by a registry is disclosed in the above Document 1 and "Grass-Hopper—A Mobile Agent Platform for IN Based Service Environments, Proceedings of IEEE IN Workshop 1998, pp. 279-290, May 1998 ([GrassHopper]; Document 2).

On the other hand, the following are required for management of locations of mobile agents due to its nature: (1) immediacy of information to inquiry whereby one is capable of providing up-to-date information; (2) high traceability, such that, in case of a failure in distributed surroundings, one is capable of tracing as many agents as possible in as short a time as possible until restoration; (3) scalability, whereby one is capable of supporting a larger number of agents or more accumulated number of movement; and (4) low cost for information management whereby small overhead is involved in movement of agents.

However, the methods disclosed in the above Documents 1 and 2 do not meet these requirements sufficiently.

It is therefore an object of the present invention to provide an apparatus and a method for managing mobile agents that meet demands of location management of mobile agents in a higher quality.

SUMMARY OF THE INVENTION

To achieve the above and other objects, an apparatus for managing mobile agents involved in the present invention is one comprising a plurality of agent servers and a registration server keeping locations of mobile agents, wherein each of the agent servers has means for keeping history of movement of each of the mobile agents and means for keeping requests for updating location information of each of the agents, periodically renewing location information of each of the mobile agents kept by the registration server with the kept request for updating location information.

Preferably, each of the agent servers sends to the registration server the request for updating location information associated to accumulated number of movement of a corresponding mobile agent, and the registration server keeps accumulated number of movement and location of each of the mobile agents in an associated manner and renews location information of each of the mobile agents only with the request for updating location information associated with a bigger accumulated number of movement.

Also, a method for managing mobile agents involved in the present invention is one whereby a plurality of agent servers and a registration server keep locations of mobile agents. On each of the agent servers, history of movement of each of the mobile agents is kept, and requests for updating and deleting registries are kept. The location information of each of the mobile agents kept by the registration server is periodically refreshed with the kept requests for updating and deleting.

BRIEF DESCRIPTION OF THE DRAWINGS

The invention will now be described in greater detail with specific reference to the appended figures wherein:

FIG. 16 is a diagram showing information created as a request for registration in a request buffer of an agent server;

FIG. 17 is a diagram showing entries included in a table managed by a registration server;

FIG. 18 is a diagram showing information included in history of movement;

FIG. 29 is the first diagram showing results of evaluation of a method for managing mobile agents involved in the present invention; and FIG. 30 is the second diagram showing results of evaluation of a method for managing mobile agents involved in the present invention.

DETAILED DESCRIPTION OF THE INVENTION

The method for managing mobile agents involved in the present invention is structured to combine a registration server (registry) for centrally managing locations of agents and the history of movement (log) left by each of the agent servers so as to solve the problems of each of these two methods and meet the requirements for managing locations of mobile agents better.

Before explaining the method for managing mobile agents involved in the present invention, the general mechanisms of movement of mobile agents, registry and logging are explained.

Figure 1:
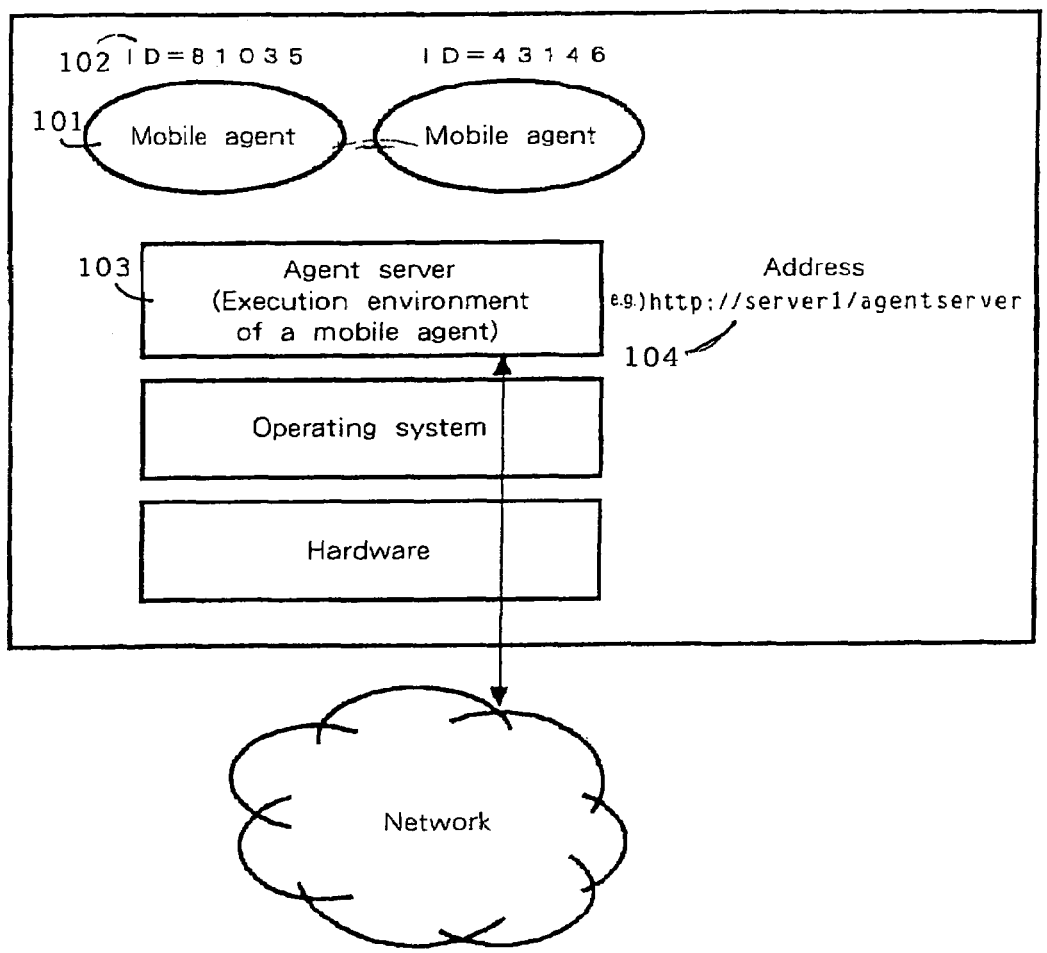
FIG. 1 is a diagram representing a relation between mobile agents and an agent server.

FIG. 1 shows a relation between mobile agents and an agent server. Generally, each mobile agent (101) has a unique ID (102) in distributed surroundings, and requires a run time process such as an agent server (103) as its execution environment. Each agent server is identified by address (104) using a URL and so on. An agent server manages mobile agents and implements their execution and movement. For mobile agents, an agent server is a subject of the movement destination.

Figure 2:
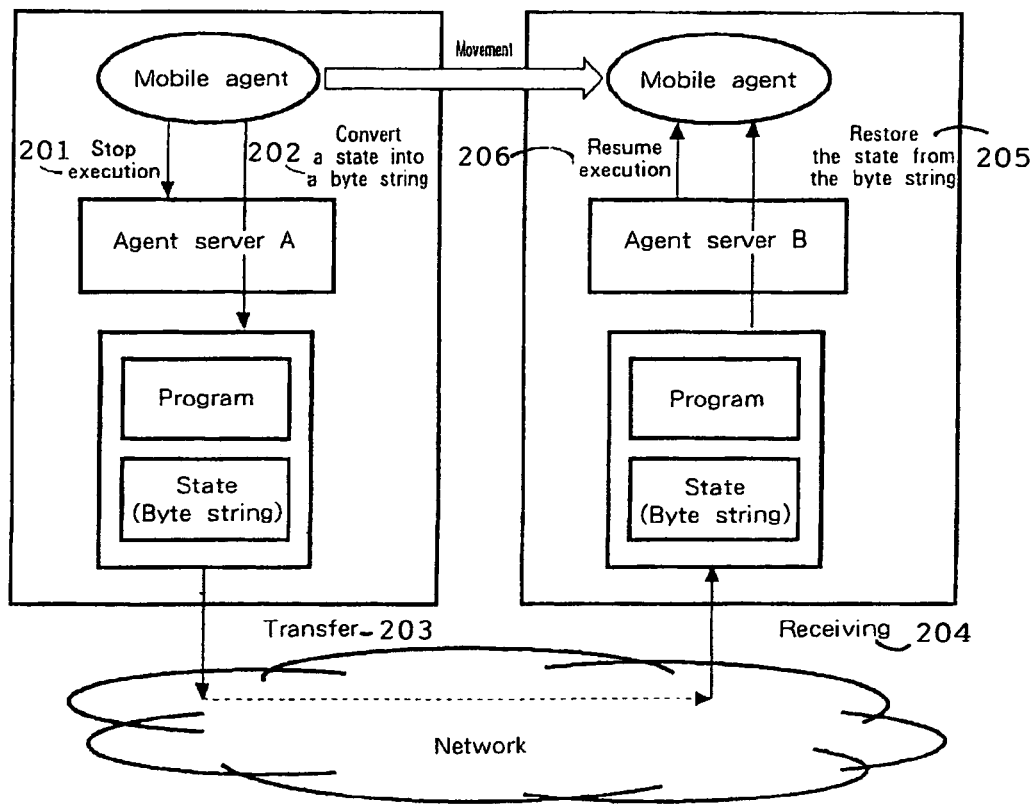
FIG. 2 is a diagram showing processing performed by an agent server of a movement source to let mobile agents move.

To move mobile agents, an agent server at the movement source performs the following processing (FIG. 2 of stopping execution of a mobile agent and deleting the entry of the agent from the list (at 201). Next, the agent server converts a state of the mobile agent into a byte string (at 202) and transfers to the agent server of the movement destination a program of the mobile agent and a byte string wherein its state is converted (at 203).

Also, the agent server of the movement destination generates a mobile agent by the following processing, accepting a request from the movement source by receiving a program and a byte string of the mobile agent (at 204). The agent server then restores the state of the mobile agent from the received byte string (at 205) and adds an entry of the mobile agent restored on the list and resume executing the agent (at 206). Movement of the mobile agent is completed by processing of the agent servers of the movement source and destination.

Tracing Mobile Agents (Registry)

Figure 3:
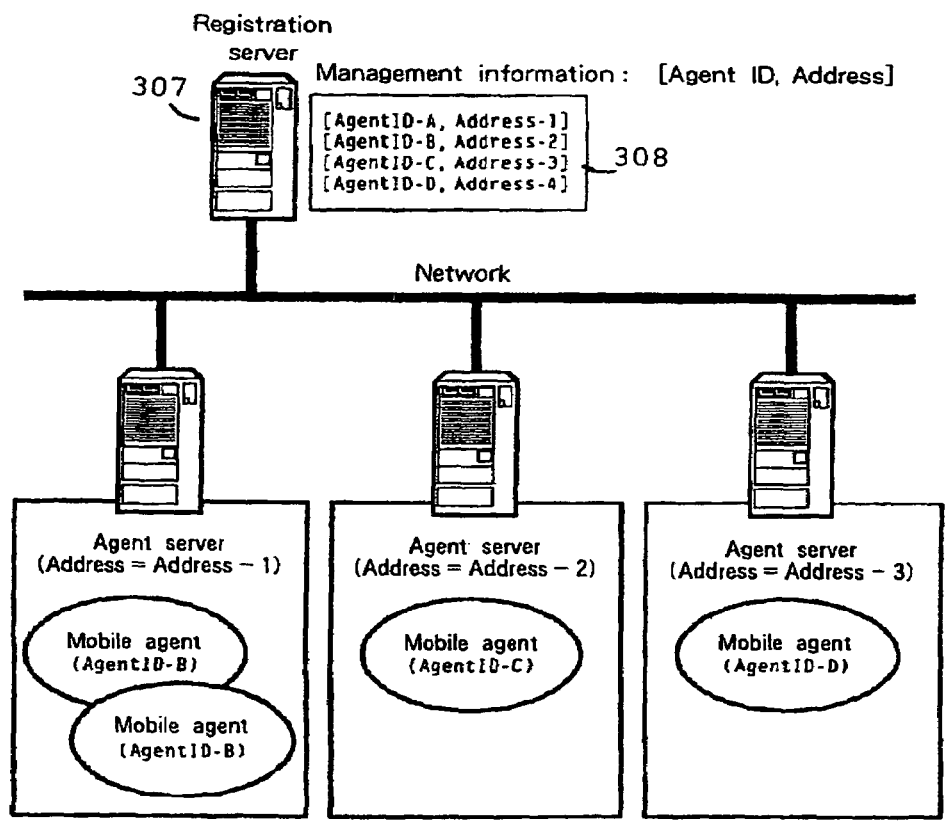
FIG. 3 is a diagram showing the first method of tracing a mobile agent (registry)

Next, as one of the methods of tracing mobile agents, registry, or registration, is explained (FIG. 3). It records a new location on a registration server every time an agent moves. One registration server (307) exists within a range of movement of mobile agents, managing a table (308) comprising the mobile agents' IDs (agent IDs) and their locations (addresses).

Figure 4:
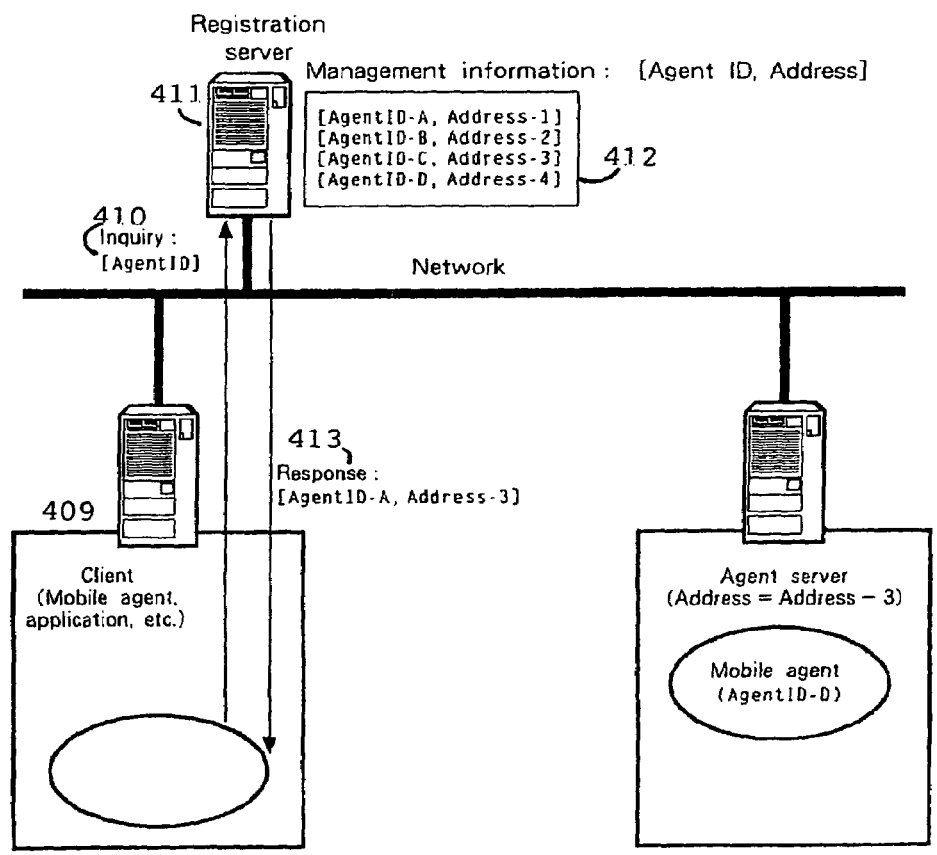
FIG. 4 is a diagram showing an inquiry to a registration server to know location of a mobile agent.

To know a location of a mobile agent, an inquiry should be made to a registration server (FIG. 4). A client (409) wanting to know a location of a mobile agent makes an inquiry to a registration server by using the mobile agent's ID as a parameter (at 410). The registration server (411) that received the inquiry retrieves an applicable entry from the management table (412) and responds with the consequence (413). If an entry cannot be found in the management table, it responds to the effect that "the mobile agent cannot be found."

Figure 5:
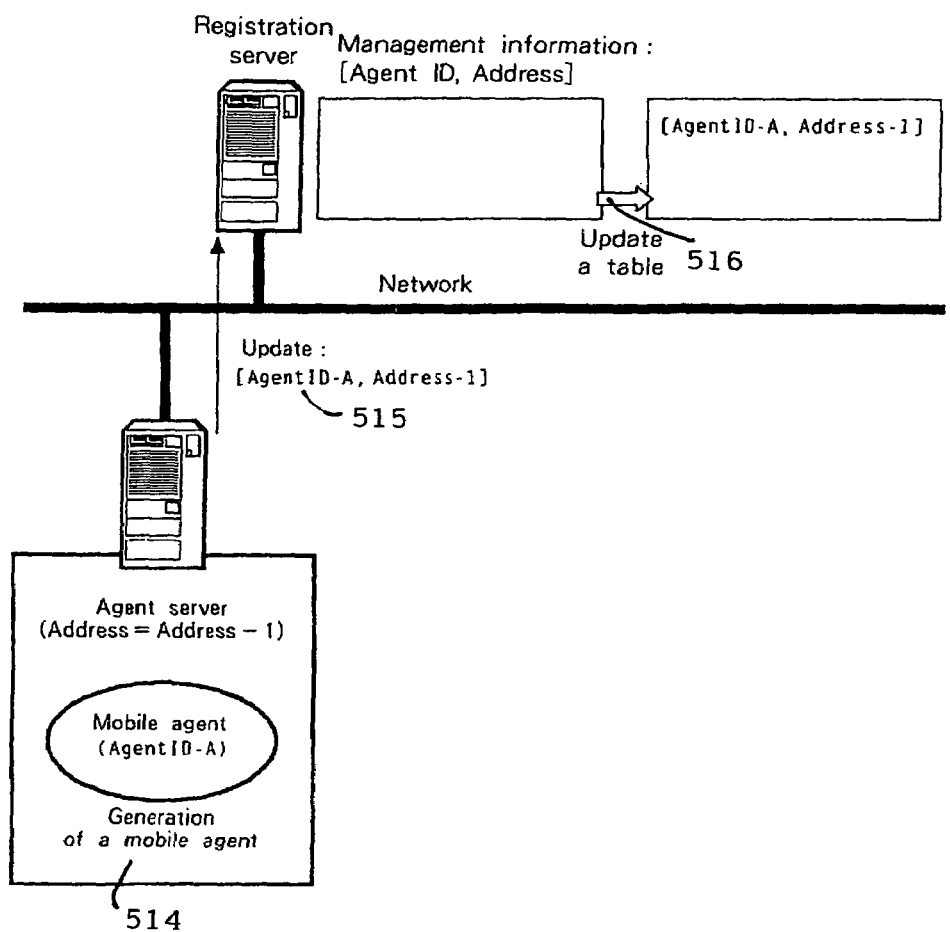
FIG. 5 is the first diagram showing an update of a management table of a registration server.
Figure 6:
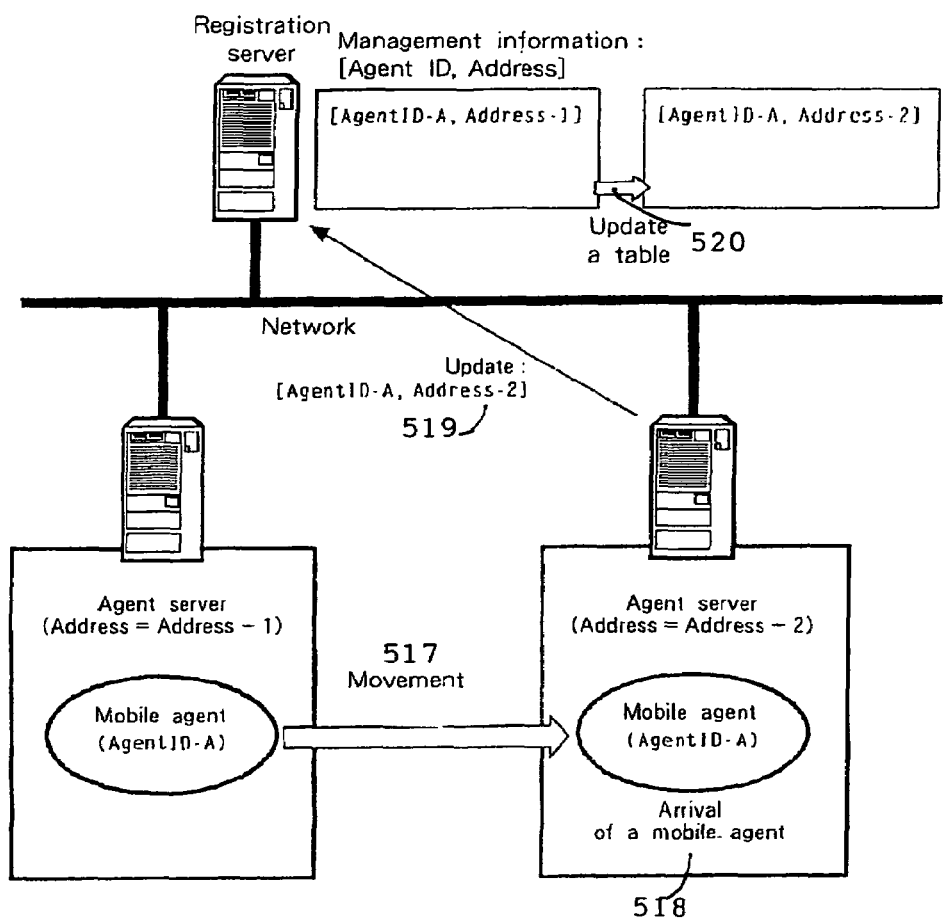
FIG. 6 is the second diagram showing an update of a management table of a registration server.
Figure 7:
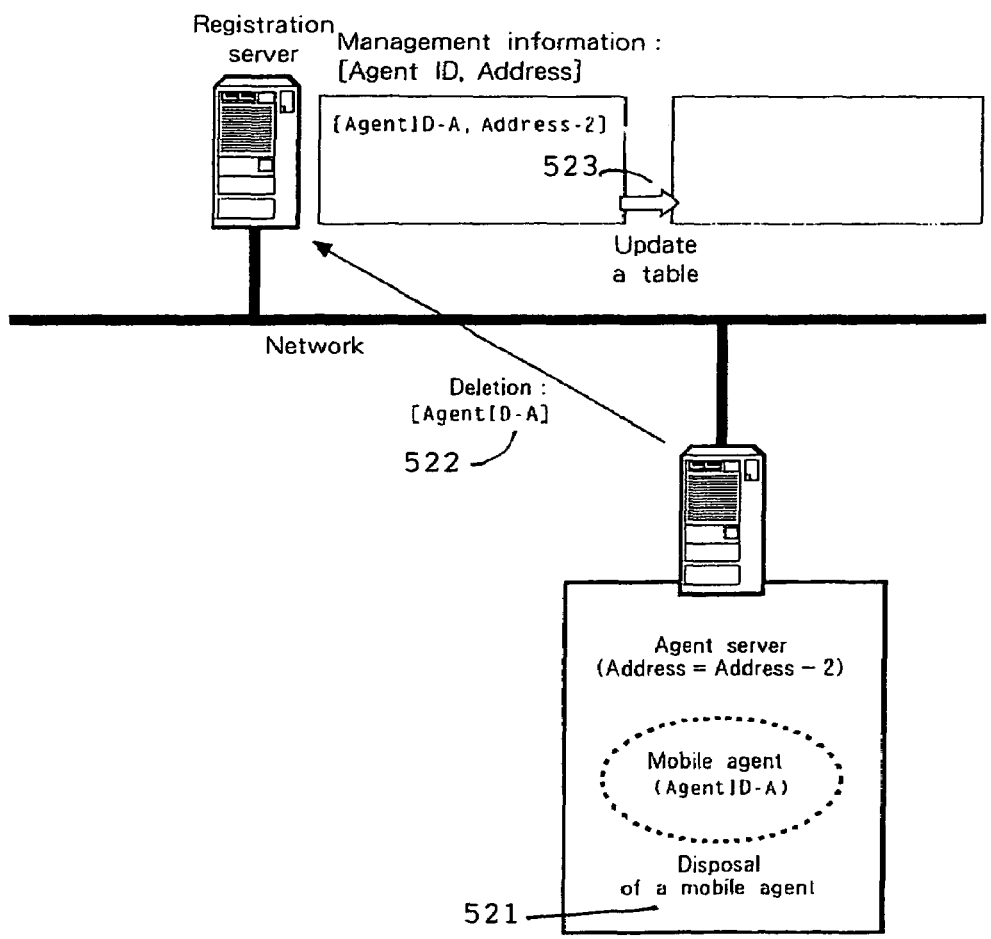
FIG. 7 is the third diagram showing an update of a management table of a registration server.

A management table of a registration server is updated when a mobile agent is generated, deleted and moved (FIGS. 5 to 7). Details of the timing are different depending on implementation, but they are mainly as follows: When generating a mobile agent (514): Immediately before the agent server starts to carry it out, a request for updating (515) is sent to the registration server, which then updates the management table (516).

When a mobile agent moves (517): Immediately before the agent arrives at the agent server of the movement destination (518) and resumes executing it, a request for registering a new location of the mobile agent is sent to the registration server (519). The registration server that received the request then rewrites an entry of an applicable management table (520).

When a mobile agent is disposed (521): Immediately before stopping execution of it, a request for deletion (522) is sent to the registration server, which then deletes an applicable entry from the management table (523).

While registry is simple and easy to implement, it has the following problems.

(1) Overhead occurs for registering a new location on a registration server every time an agent moves.

(2) Performance is lowered by concentration of access to a registration server.

Tracing Mobile Agents (Logging)

Figure 8:
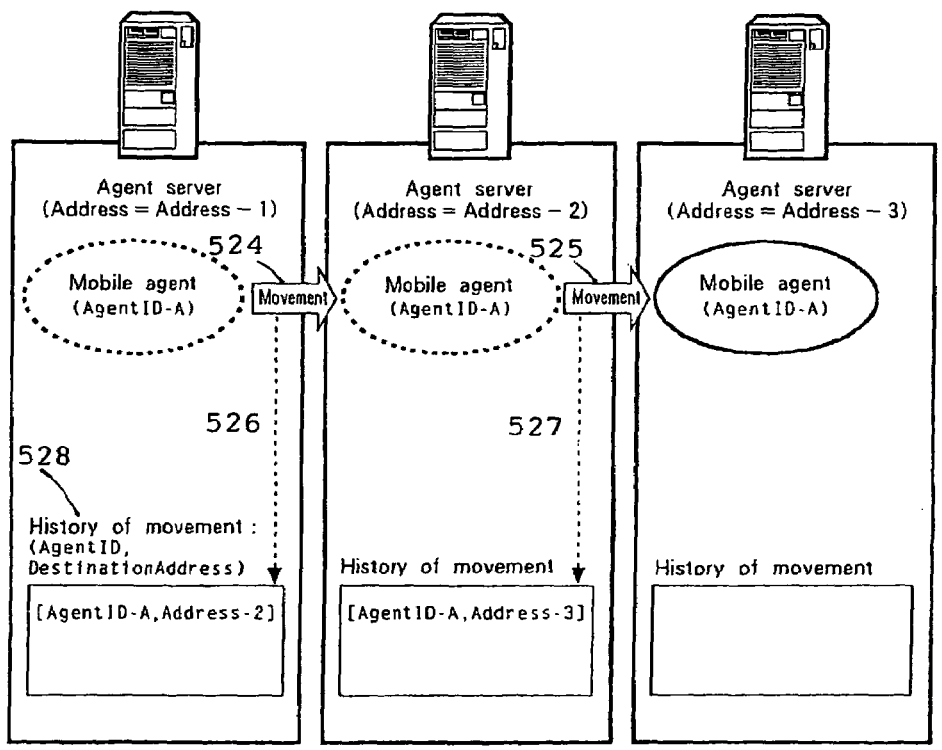
FIG. 8 is the first diagram showing the second method of tracing a mobile agent (logging)
Figure 9:
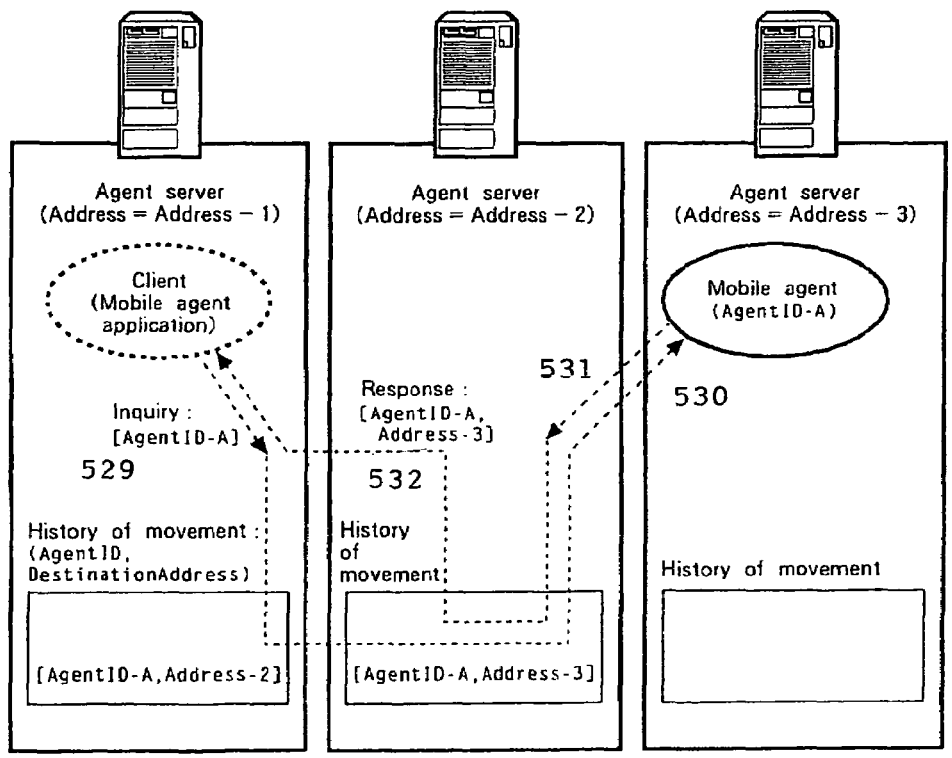
FIG. 9 is the second diagram showing the second method of tracing a mobile agent (logging)

Next, as another method of tracing mobile agents, logging is explained (FIGS. 8 and 9). That is, every time an agent moves (524, 525), history of movement is left at an agent server of the movement source (526, 527) so as to follow it when inquired (529) (530). History of movement (528) is a table comprising the following entries.

Table 1

[AgentID, DestinationAddress] (1)

However, AgentID is a mobile agent ID and used as a key to this table, and DestinationAddress is an address identifying an agent server of the movement destination.

An inquiry, namely a request for tracing is passed between an agent and a server in succession according to history of movement, and when it has finally arrived at an agent server where the mobile agent exists (531), the agent server's address is given in response as a consequence of tracing (532).

Figure 10:
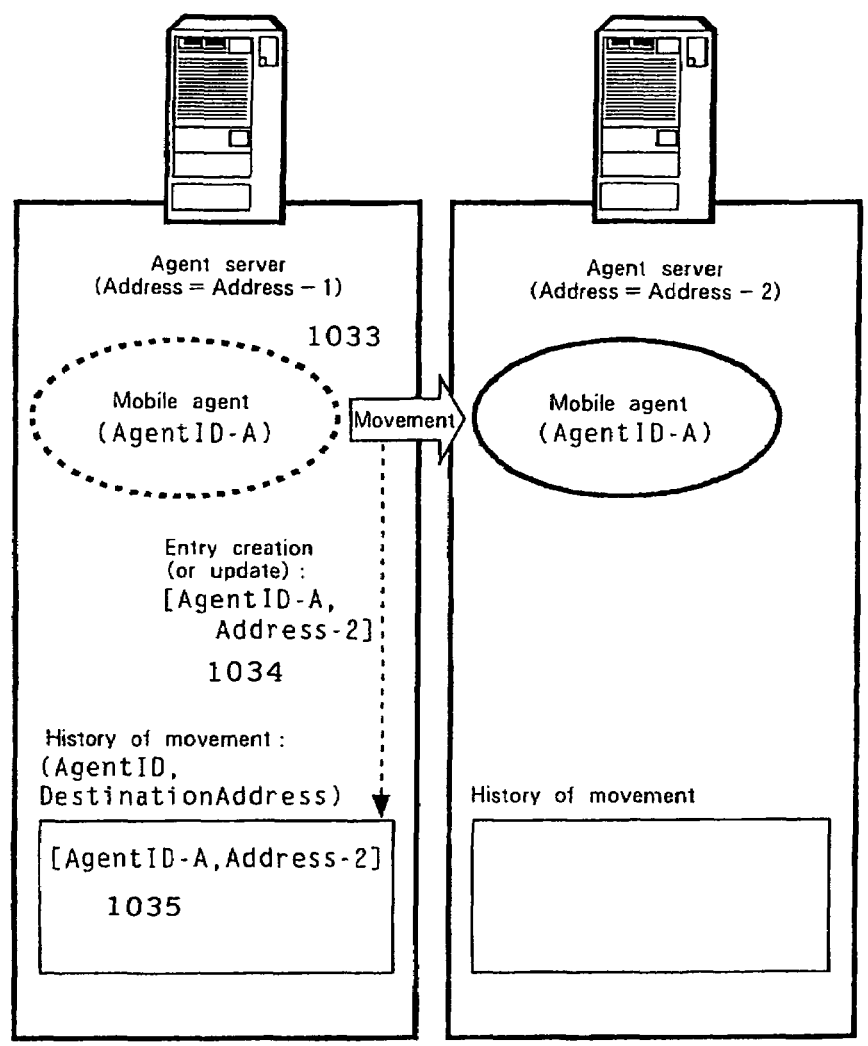
FIG. 10 is a diagram showing an agent server updating history of movement when a mobile agent moves to another agent server.
Figure 11:
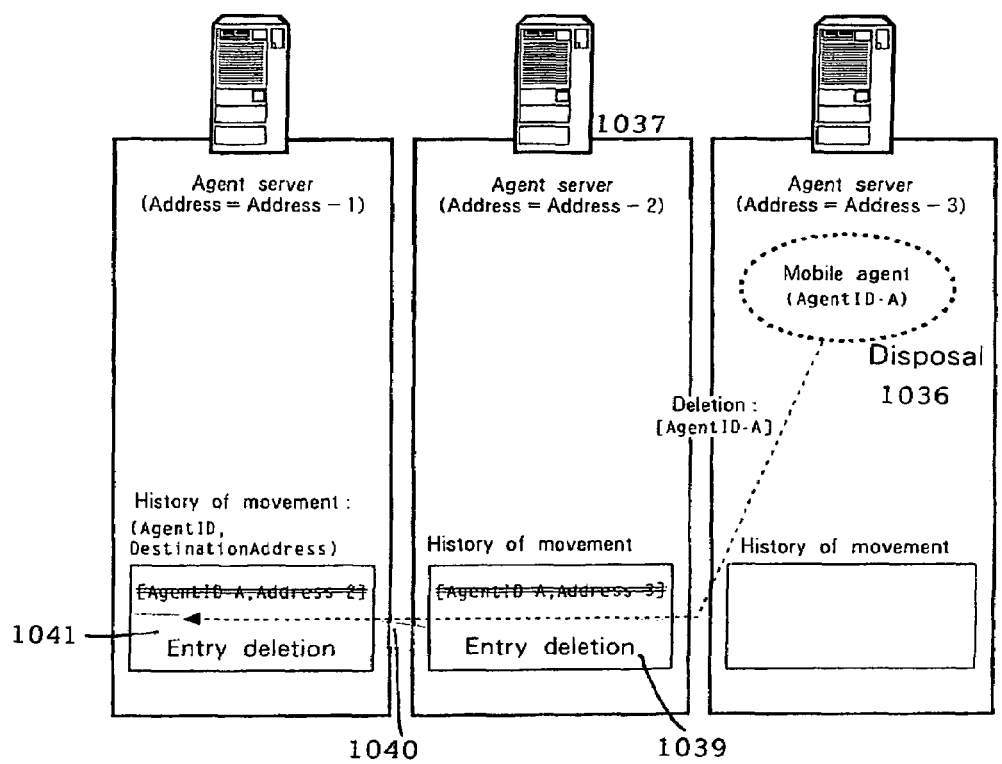
FIG. 11 is a diagram showing an agent server updating history of movement when it receives a request for deleting an entry of a disposed mobile agent.

The following explains management of history of movement that is performed by an agent server. An agent server updates history of movement when a mobile agent moves to another agent server (FIG. 10) and when it receives a request for deleting an entry of a disposed mobile agent (FIG. 11).

When a mobile agent starts moving (1033), it leaves in history of movement at the movement source an entry (1034) describing an address of an agent server of the movement destination (1035). When a mobile agent is disposed (1036), it sends a request for deletion (1038) to the agent server (1037) of the movement source. The agent server (1037) that received the request for deletion deletes an applicable entry from its own history of movement (1039) and further sends the same request for deletion to the agent server of the movement source (1040). Thereafter it repeats sending the request for deletion up to the starting point (104.1) of a chain of history of movement.

Logging has little overhead of movement since only local and light processing on an agent server is required on movement of a mobile agent. It also has a benefit of having no concentration of access to a server like that of registry, while there are the following problems.

(1) Even if one of the agent servers on a chain of history of movement of a mobile agent fails, that agent becomes untraceable.

(2) That mobile agent cannot be traced unless it is from an agent server on a chain of history of movement of a mobile agent.

(3) When a mobile agent is disposed, it is necessary to erase history of movement so that the cost is high when agents are frequently disposed.

Figure 12:
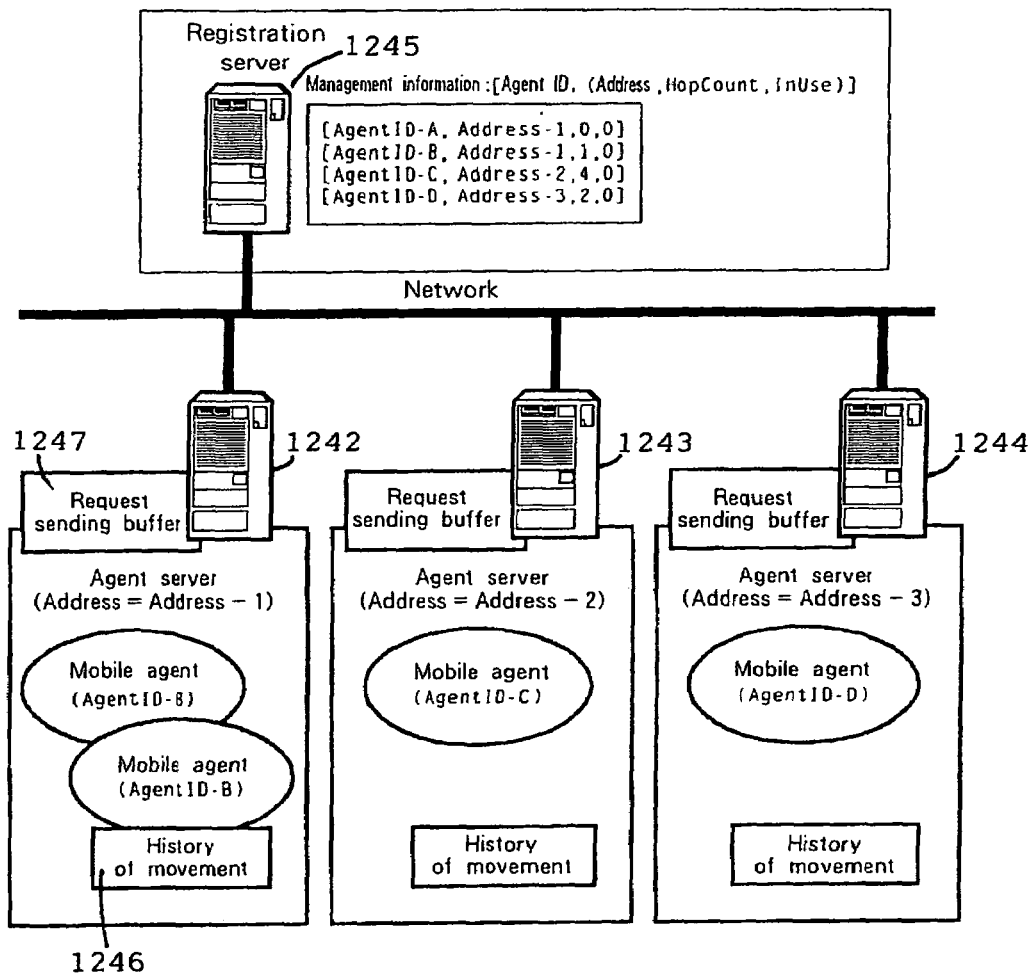
FIG. 12 is a diagram showing the system environment assumed in the present invention.

The following explains a method of managing mobile agents involved in the present invention. The present invention allows improvement of scalability and inquiry of current locations of mobile agents at any time by combining registry and logging. The system environment (FIG. 12) assumed in the present invention comprises, just as the above-mentioned registry, a plurality of agent servers (1242, 1243, 1244) and one registration server (1245).

Figure 13:
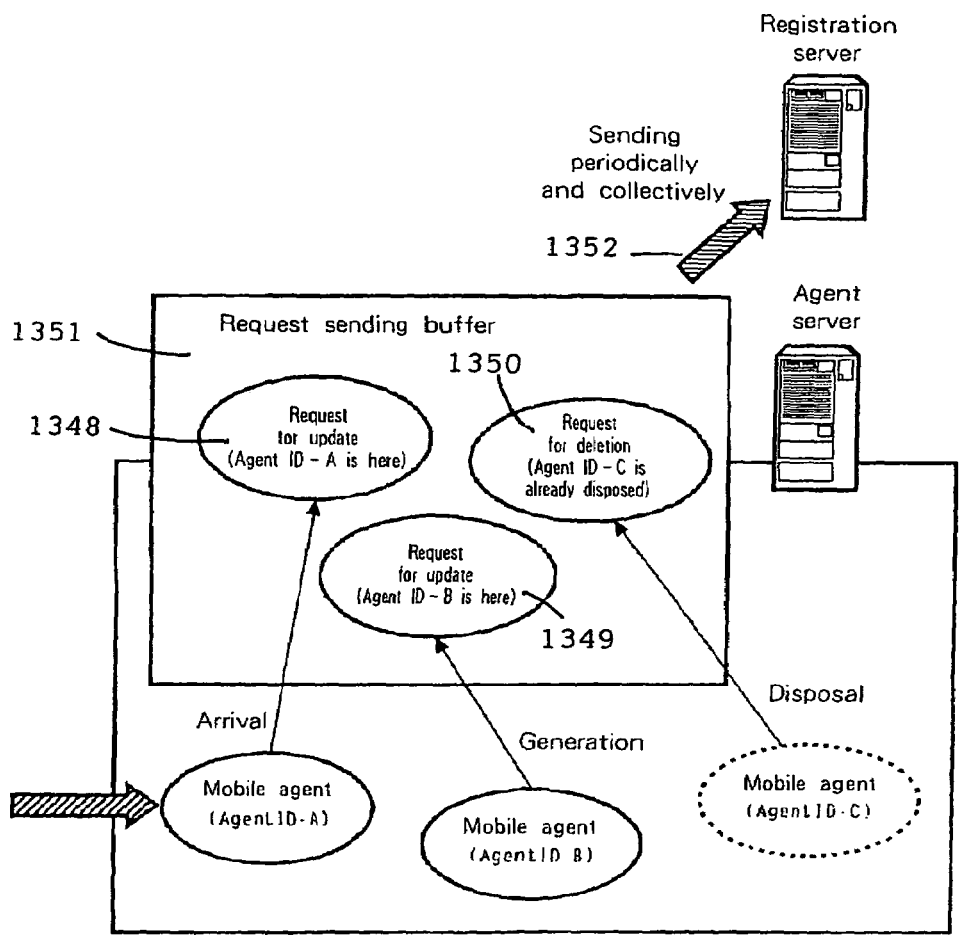
FIG. 13 is a diagram showing a request sending buffer owned by each agent server.

Each of the agent servers (1242, 1243, 1244) has a function of keeping and managing history of movement (1246) just as the above-mentioned logging. In the present invention, however, each agent server also has a request sending buffer (1347) as shown in FIG. 13. A request sending buffer is a place for temporarily storing information equivalent to requests for update (1315, 1319) and for deletion (1322) in registry in order to send such information collectively and periodically.

Request Buffering

In registry, if frequency of events occurring to mobile agents in distributed surroundings managed by a registration server becomes high, then the requests concentrate on the registration server and the performance becomes problematic, so it can no longer be scalable. This is because information is updated to the registration server every time an event such as generation, movement or disposal occurs to an individual mobile agent. To solve this problem, this method avoids updating location information for each individual mobile agent, and buffers requests for updating (1348, 1349) and deleting (1350) location information once to a request sending buffer (1351) of the agent server.

Contents of a request sending buffer periodically renew a management table of a registration server (1352). Request buffering makes it possible to uniformly control frequency of requests to the registration server and improve scalability.

Combination with Logging

In this method, there arises a problem that buffering of requests delays update of information of a registration server so that its information is not always current. To handle this problem, history of movement should be left on an agent server just as in the case of logging. Consequently, it becomes possible, by following history of movement starting from location information of the registration server, to always inquire about current location information.

Figure 14:
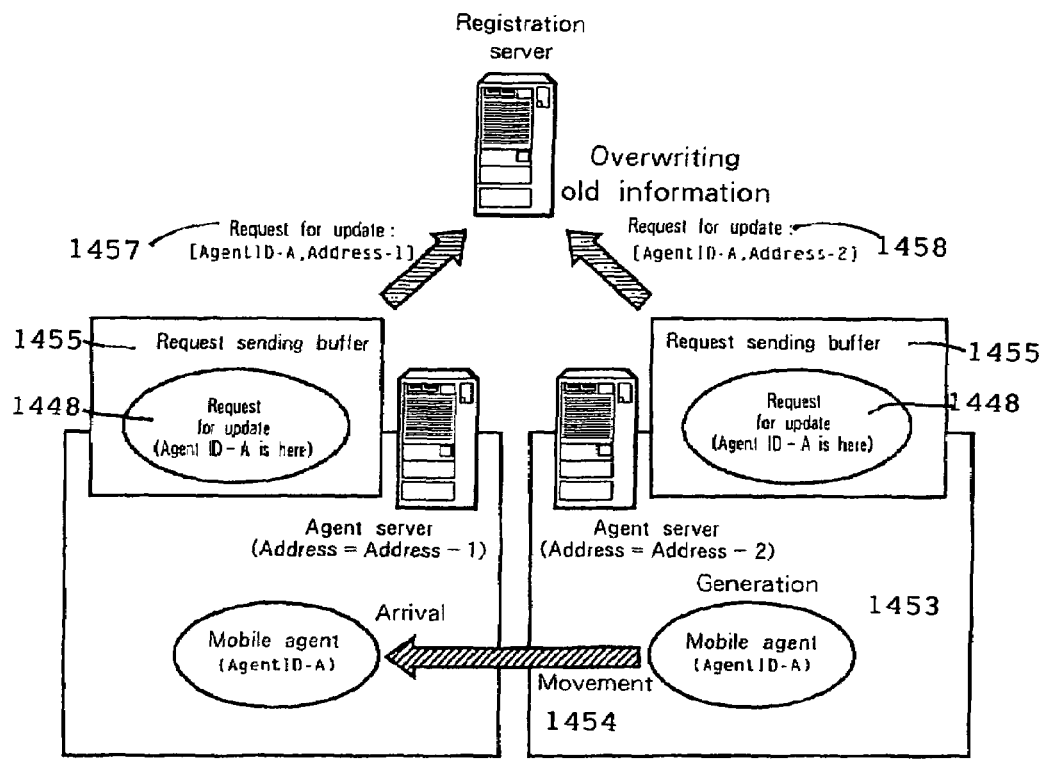
FIG. 14 is a diagram showing a case where the order of sending requests to a registration server becomes varied.

Another problem arising from request buffering is a possibility that the order of sending requests to the registration server becomes varied (FIG. 14). It means that the problem of newer location information overwritten by older information must be handled. For instance, a case where a mobile agent is generated on agent server 2 (1453) and moved to agent server 1 (1454) is considered. At such time, while a request for registration is buffered in a request buffer of each agent (1455, 1456), if the registration server is renewed first with contents of a request buffer of agent server 1 (1455) and later renewed with contents of a request buffer of agent server 2 (1456), newer location information of agent server 1 (1457) is overwritten by older information of agent server 2 (1458).

If overwriting by older information arises, a chain of history of movement starting from information of the registration server becomes longer so that not only the cost for tracing increases but also the agent server must keep the history of movement for a longer period and consequently more history of movement must be kept.

Figure 15:
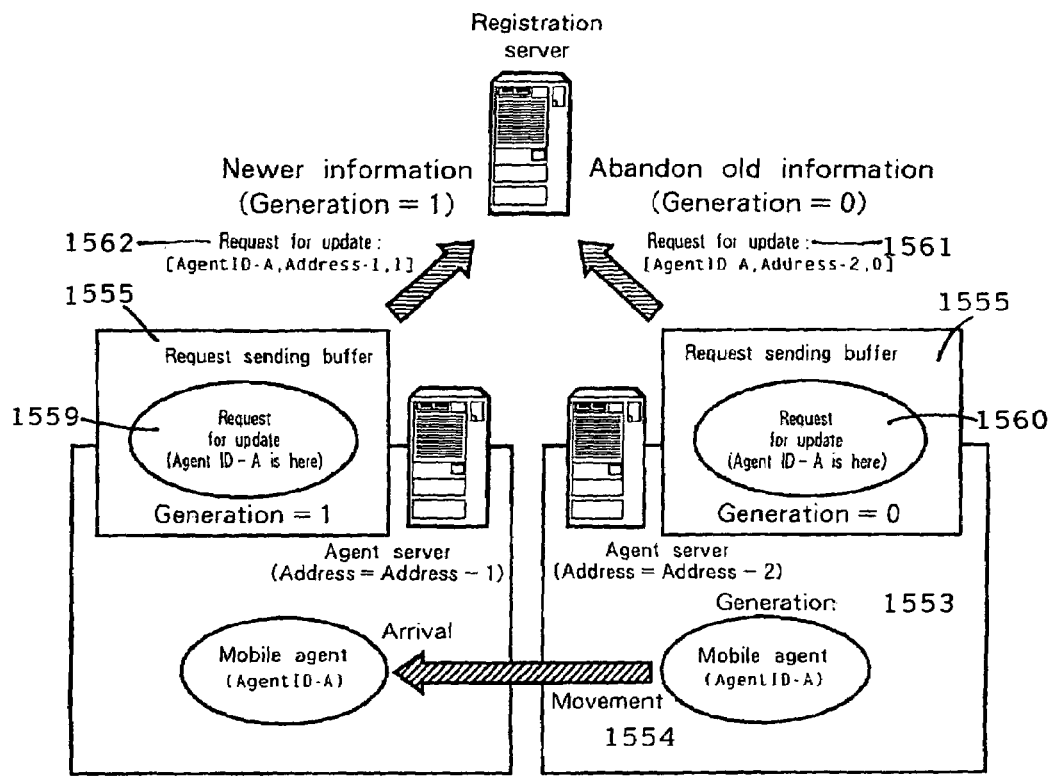
FIG. 15 is a diagram showing a concept of a request generation.

To handle such problems, this method introduces a concept of a request generation (FIG. 15). A request generation can use accumulated number of movement of a mobile agent as of the time the request was created. In this case, the larger the value is, the newer generation it represents. Inclusion of generation information into a request (1559, 1560) can prevent the registration server from overwriting newer information (1562) already registered in a management table by older information (1561).

EMBODIMENT

Hereafter, as an embodiment of a method for managing mobile agents involved in the present invention, location information to be buffered to each agent server, management information of a registration server and history of movement are described, and then a update algorithm of such information and an algorithm for tracing mobile agents are explained.

Information Managed by a Registration Server and an Agent Server

This method generates the following information in a request buffer of an agent server as a request for registration when a mobile agent is generated, arrives or is disposed as a result of movement (FIG. 16).

Table 2

[AgentID, (Kind, HopCount)] (2)

It should be noted that AgentID is an ID of an applicable mobile agent, and HopCount is total accumulated number of movement of a mobile agent as of the time this information is created. For instance, 0 is entered in HopCount on generation. Kind takes a value such as REGIST or UNREGIST, namely REGIST on generation and arrival of a mobile agent and UNREGIST on its disposal.

A registration server manages a table comprising the following entries (FIG. 17).

Table 3

[AgentID, (Address, HopCount, InUse)] (3)

It should be noted that AgentID is an ID of an applicable mobile agent, Address is an address of an agent server showing a starting point of retrieval of the mobile agent. If Address is empty, it shows that the entry is a candidate for deletion. Also, HopCount represents a generation of this information, indicating that, the larger the value is, the newer the information is.

More specifically, accumulated number of movement of a mobile agent as of the time the information is created is used. An integral value is entered in InUse, and if it is 1 or more, it shows that this entry is being used for tracing a mobile agent.

An agent server manages history of movement in addition to requests for registration. History of movement is generated when a mobile agent moves from the agent server and includes the following information (FIG. 18).

Table 4

[AgentID, Destination] (4)

AgentID is an ID of an applicable mobile agent, and Destination is an address of an agent server of movement destination.

Update Algorithm of Management Information

Figure 19:
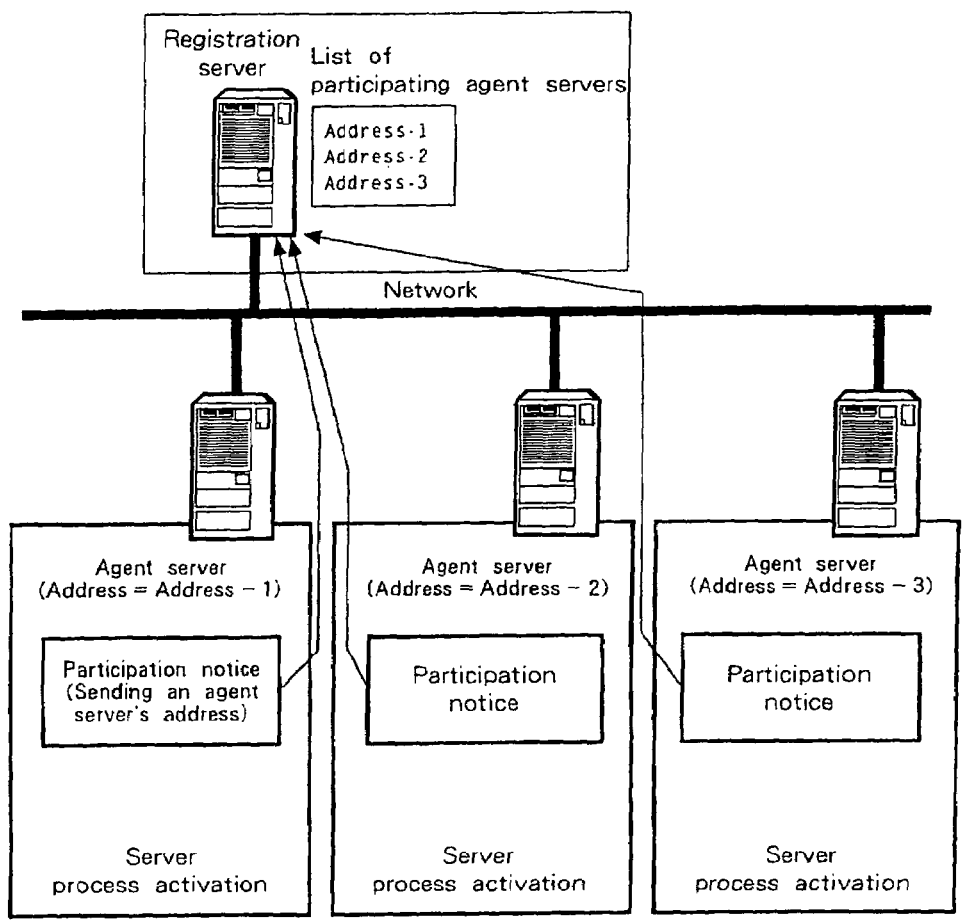
FIG. 19 is a diagram showing a process of each agent server on activation informing a registration server in distributed surroundings of a will to participate.
Figure 20:
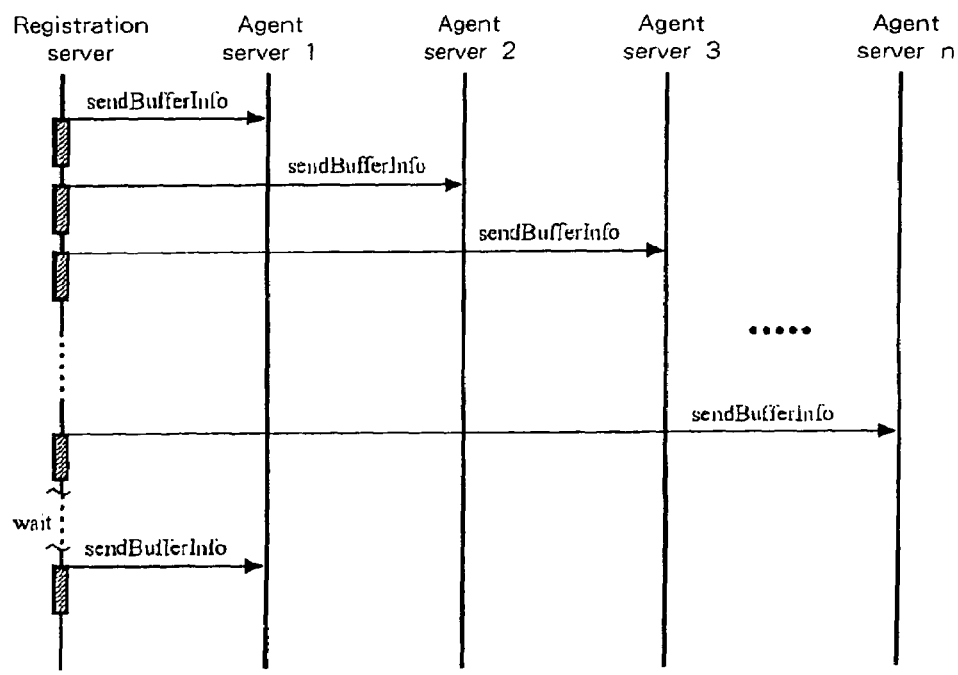
FIG. 20 is a diagram showing a process of periodically requesting the agent servers to send the contents of request buffers.

First, each agent server informs a registration server in distributed surroundings of a will to participate (FIG. 19). The registration server receiving this manages a list of the participating agent servers, and periodically requests the agent servers to send the contents of request buffers (FIG. 20).

Here, this request to agent servers is called "sendBufferInfo." When requesting sendBufferInfo, of entries of a management table, those with 1 or more as InUse value and Address being an address of an agent server for sending a request are collected to be parameters of a sendBufferInfo request. A response of sendBufferInfo renews a management table of a registration server, and at that time, an entry is updated only when HopCount is larger.

This is intended to renew a management table with newer information. If Kind is UNREGIST, however, it is the newest and last information and there cannot be any newer information, and thus it immediately renews the management table irrespective of a HopCount value. Also, in Address of an updated entry, an address of an agent server that responded is set for a request where Kind is REGIST, and a null value is set if Kind is UNREGIST.

Figure 21:
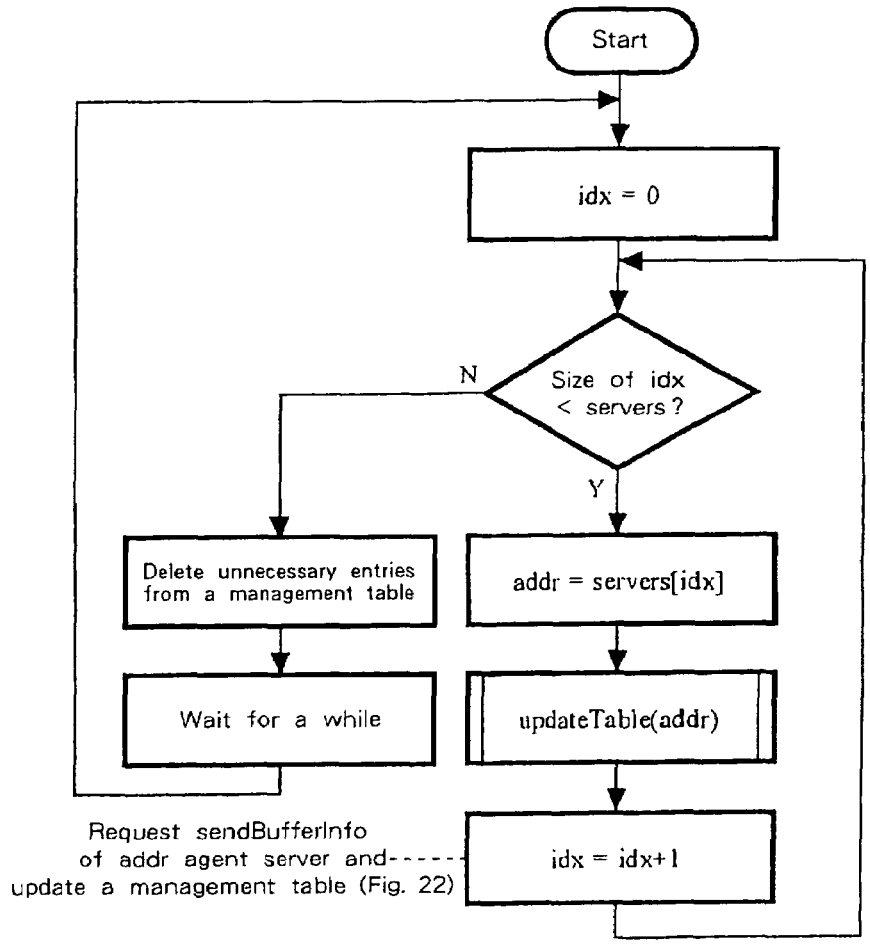
FIG. 21 is the first diagram showing this series of algorithms of processing performed by a registration server.
Figure 22:
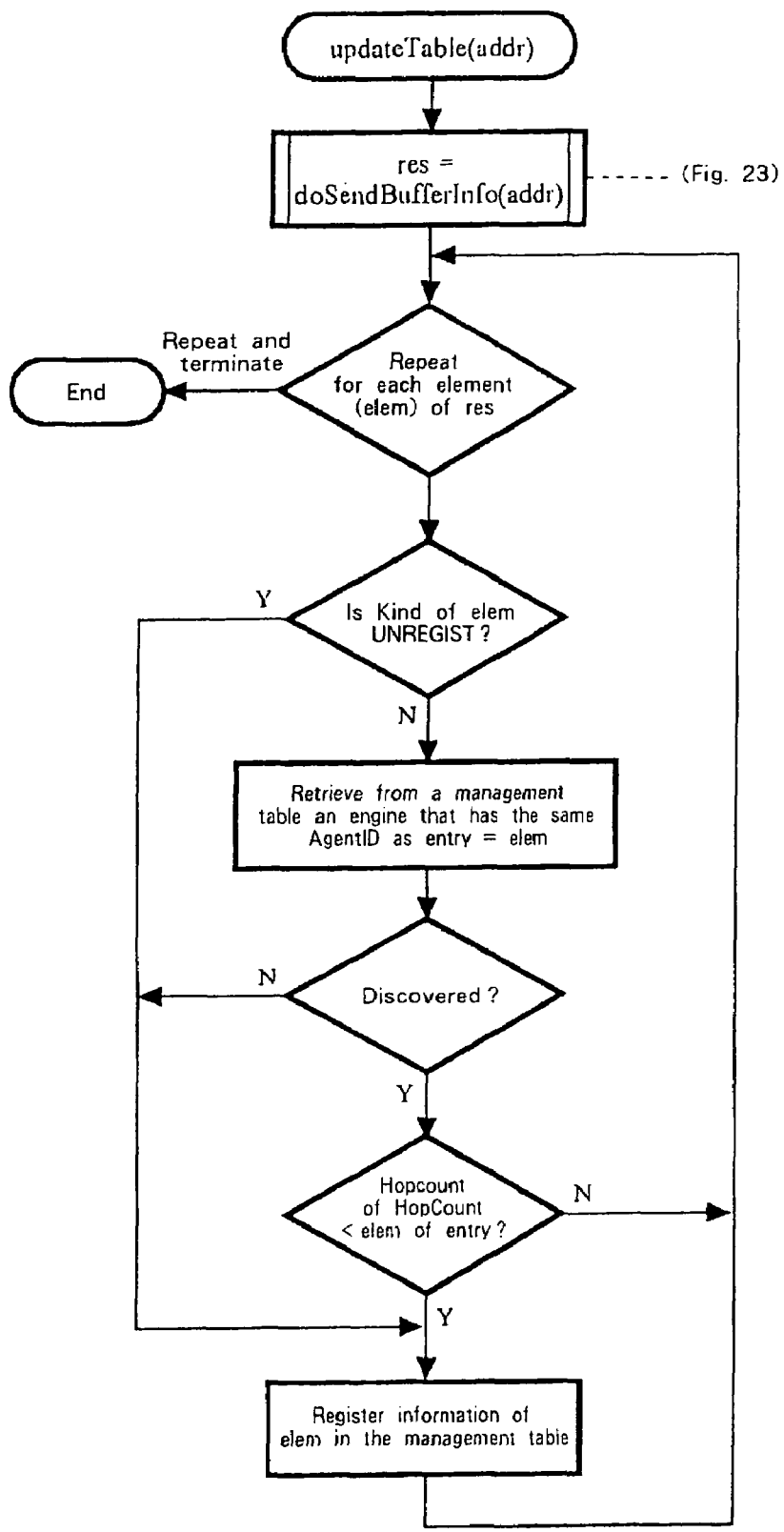
FIG. 22 is the second diagram showing this series of algorithms of processing performed by a registration server.
Figure 23:
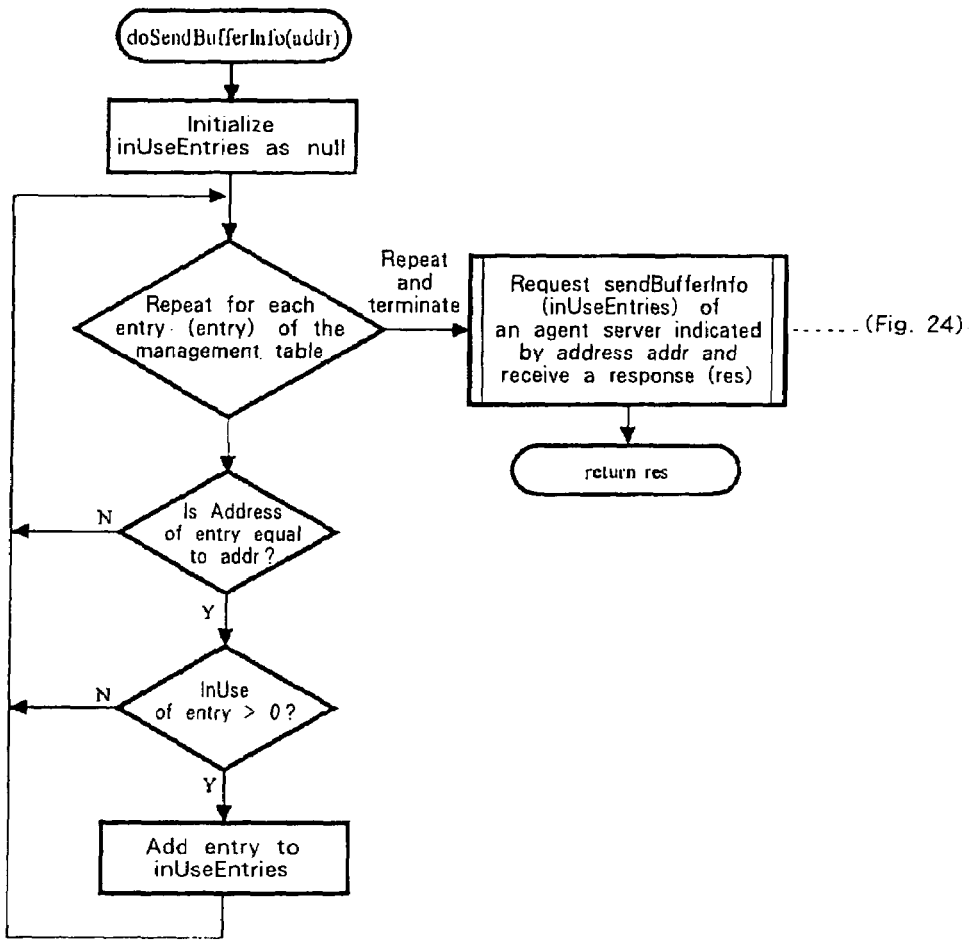
FIG. 23 is the third diagram showing this series of algorithms of processing performed by a registration server.

Lastly, the registration server sends a sendBufferInfo request to all the participating servers and processes their responses, and then it deletes unnecessary entries. Unnecessary entries are candidates for deletion, namely the entries of which Addresses are empty. The algorithms for the series of processing performed by the registration server are shown in FIGS. 21 to 23.

Figure 24:
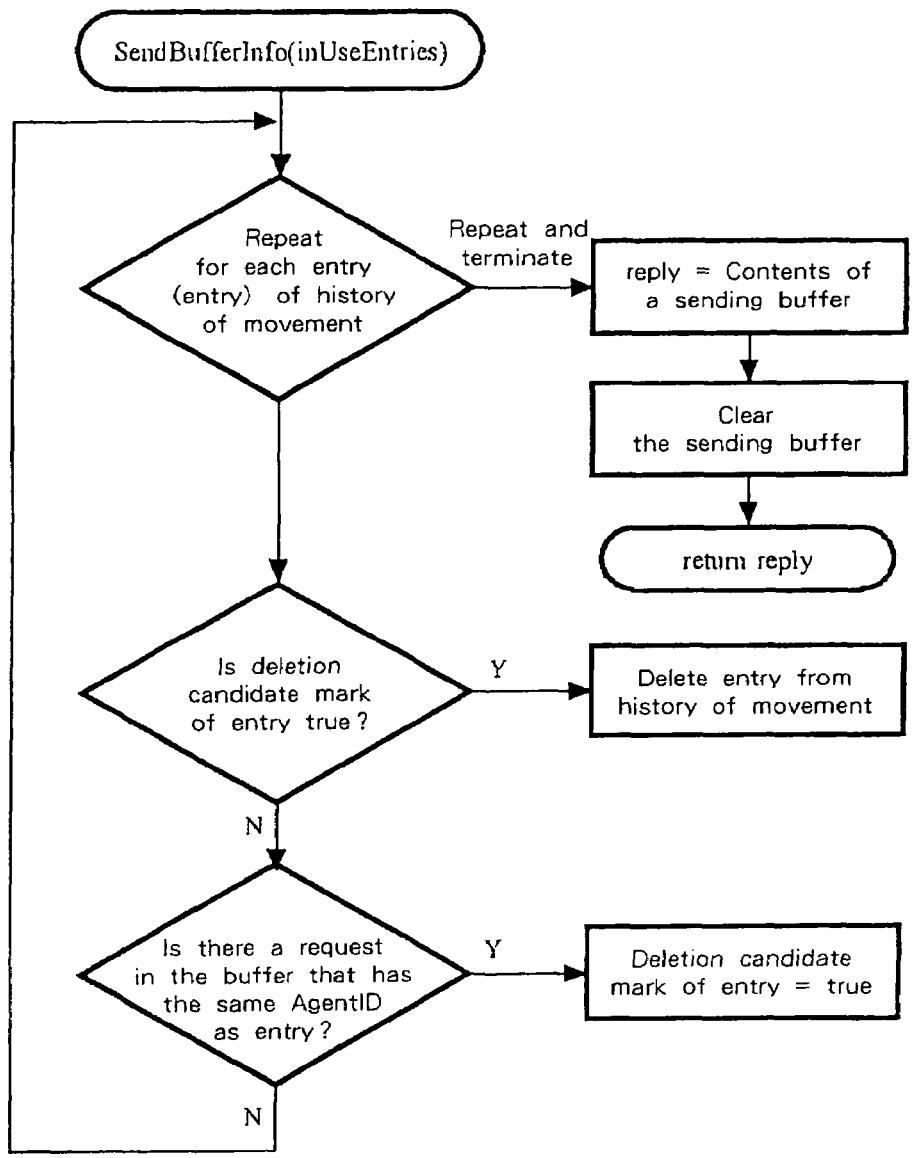
FIG. 24 is a diagram showing a process of an agent server that received a sendBufferInfo request.
Figure 25:
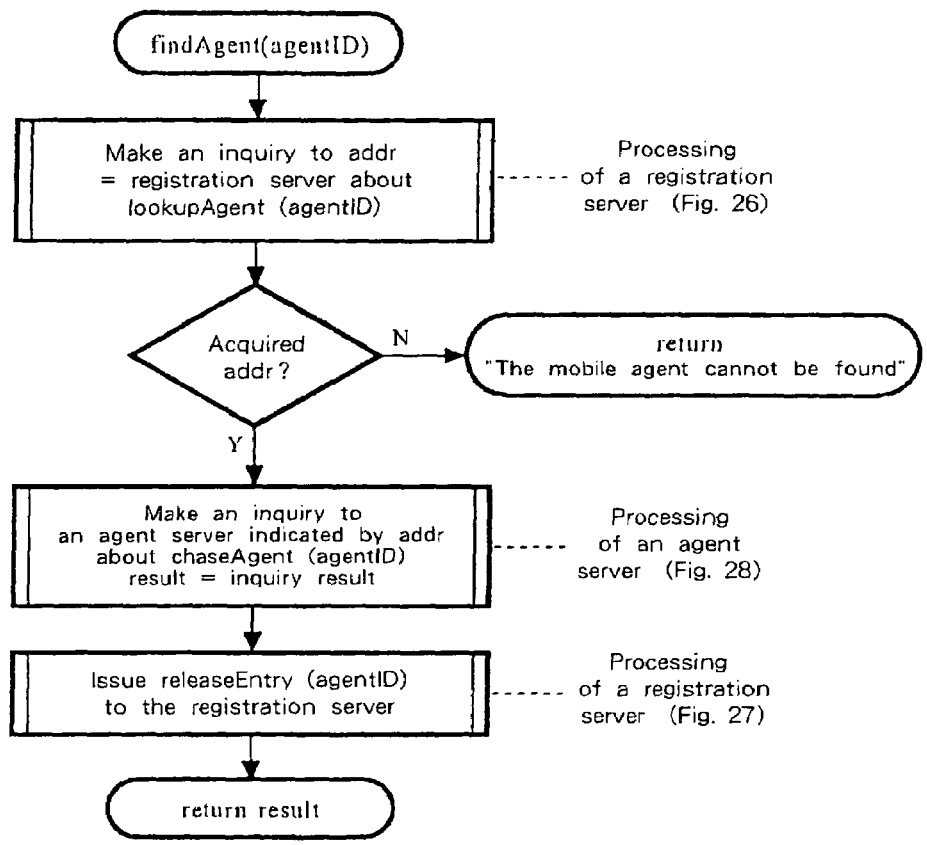
FIG. 25 is the first diagram showing an algorithm of tracing a mobile agent.
Figure 26:
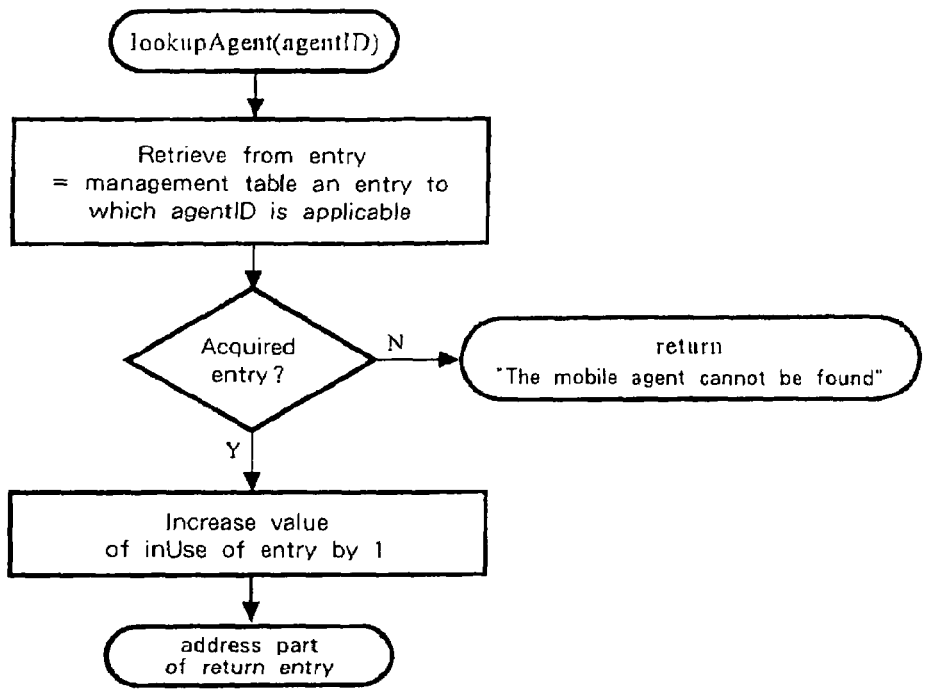
FIG. 26 is the second diagram showing an algorithm of tracing a mobile agent.
Figure 27:
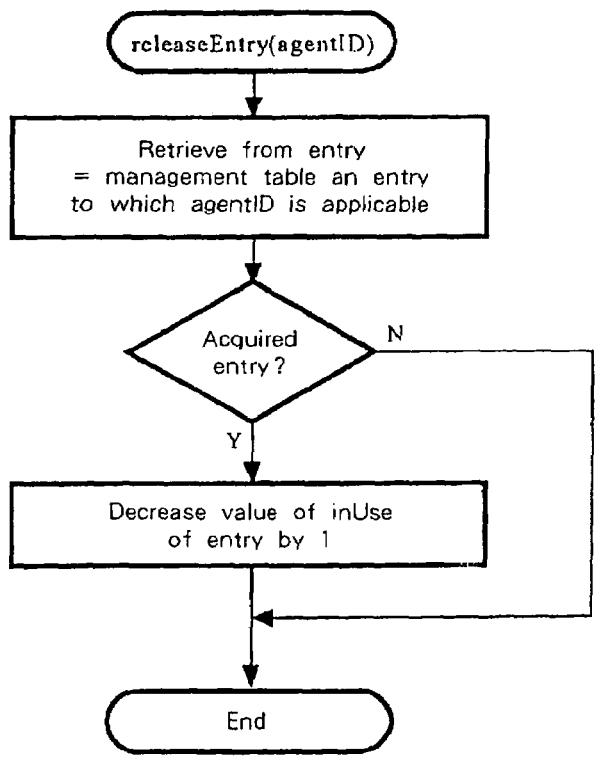
FIG. 27 is the third diagram showing an algorithm of tracing a mobile agent.
Figure 28:
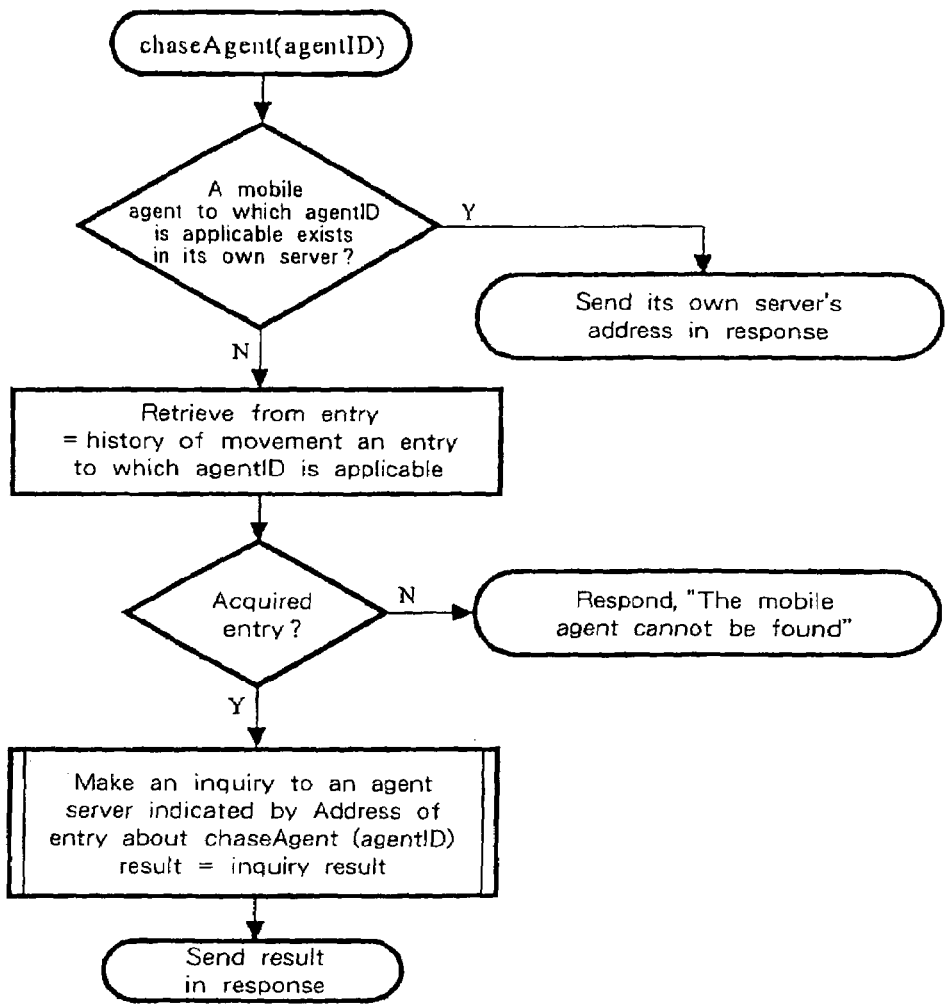
FIG. 28 is the fourth diagram showing an algorithm of tracing a mobile agent.

An agent server that received a sendBufferInfo request erases unnecessary entries of history of movement and then sends contents of the request buffer in response to the registration server, in compliance with the algorithm shown in FIG. 24. At this time, it also makes the request buffer empty.

Mobile Agent Tracing Algorithm (FIGS. 25 to 28)

In tracing a mobile agent, a starting point of tracing is acquired first by issuing an inquiry "lookupAgent" to a registration server. The registration server, on receiving lookupAgent, increases a value of an applicable entry's InUse field in the management table by 1. It is intended to avoid, while tracing it, destruction of history of movement by an agent server that received a sendBufferInfo request.

As for a value of InUse, the simplest way is to decrease it by 1, after completing tracing of a mobile agent, by advising the registration server to that effect. Besides, there is also a method of arranging it so that the value is naturally reduced by 1 after a certain period of time. In this case, the issuer of an inquiry "lookupAgent" must arrange to send a request to the registration server periodically for increasing the value of InUse field by 1 until the tracing is completed.

Once a response to "lookupAgent" of the registration server is acquired, tracing of a mobile agent is started. Namely, a request for tracing is made to an agent server of the starting point of tracing. There can be, however, a response that "the entry cannot be found" as the case may be. In this case, it is thinkable that the mobile agent does not originally exist or is already disposed. The consequence of the request for tracing is the consequence of tracing this mobile agent. An agent server that received a request for tracing searches an applicable mobile agent in its own server, and if found, sends its own server's address in response. If not found, it searches an applicable entry from history of movement, and submits a request for tracing to an agent server of a movement destination shown there, and then accepts the consequence as a response to the request for tracing to itself. If no such entry is found in history of movement, it is thinkable that a chain of history of movement is cut due to some failure.

Effect

As a facility for responding to a location inquiry about a mobile agent, ones on a registration server basis (registry) are mainly considered [MASIF, GrassHopper]. A registration server is a kind of name server, which registers a new location every time an agent moves. There is a problem to registry, however, that its performance is reduced by concentration of access to an overhead registration server for registering a new location with the registration server every time an agent moves.

Thus, registry requires contrivance such as making the range managed by one registration server smaller to reduce the number of the agents to be managed and render them distributed. It is also required to connect registration servers to broaden the range of management, but a specific facility of that facility is not proposed. While the method proposed in the present invention is expansion of registry, it has the following advantages over registry.

(1) It incurs less overhead for registering information.

(2) It is capable of location management of larger numbers of agents than registry.

(3) It is also available for distribution of messages.

Evaluation

This invention was implemented on aglets and its performance was evaluated. In this experiment, the number of agent servers was N, and initially 10 agents were positioned per agent server. Namely, there exist 10N agents in the entire system. Each individual agent repeated movement to a randomly determined agent server every other second, and the time (unit: ms) until every agent completes 20 times of movement was measured.

Moreover, the following values were set to the parameters unique to the facility of the present invention.

$$T_{expire}=6000, T_{update}=3000, P=1 \quad \text{Expression 1}$$

Measurement was performed by three methods, namely the conventional method (registry), this method and a method with no tracing facility, three times respectively. Measurement results: Case 1: N=9 (total number of agents: 90), and Case 2: N=15 (total number of agents: 150) are shown in FIGS. 29 and 30 respectively.

As mentioned above, the apparatus and method for managing mobile agents involved in the present invention were made in the light of the above-mentioned problems of the background art, and are capable of meeting demands of location management of mobile agents in a higher quality.

What is claimed is:

1. A mobile agent management apparatus comprising:
a plurality of agent servers; and
a registration server for maintaining location information of mobile agents,
wherein each of said plurality of agent servers comprises:
means for maintaining a history of movement of each of said mobile agents including a counter for accumulating a count of the accumulated number of movements for each of said mobile agents; and
request means for periodically generating requests for updating location information of each of said agents, said requests including at least a mobile agent identifier and said accumulated number of movements for said mobile agent, to renew location information at said registration server; and wherein said registration server comprises at least one register for maintaining accumulated number of movements and locations of each of said mobile agents in an associated manner and renews said location information of each of said mobile agents only upon receipt of requests for updating location information associated with a higher accumulated number of movements.

2. A method for managing locations of mobile agents by using a plurality of agent servers and a registration server for maintaining locations of mobile agents comprising the steps of:

at each of said agent servers;

maintaining a history of movement of each of said mobile agents including accumulating a count of the number of movements for each of said mobile agents; and periodically generating requests for updating and deleting registries, said requests including at least a mobile agent identifier and said count of the accumulated number of movements for said mobile agent; and at said registration server;

renewing location information of each of said mobile agents kept by said registration server with said requests wherein said registration server comprises at least one register for maintaining accumulated number of movements and locations of each of said mobile agents in an associated manner and further comprising said registration server renewing said location information of each of said mobile agents only upon receipt of requests for updating location information associated with a higher accumulated number of movements.

* * * * *